United States Patent [19]
Musil

[11] Patent Number: 4,626,766
[45] Date of Patent: Dec. 2, 1986

[54] CIRCUIT ARRANGEMENT FOR FEEDING ELECTRICAL USERS

[75] Inventor: Gerhard Musil, Munich, Fed. Rep. of Germany

[73] Assignee: Siemens Aktiengesellschaft, Berlin and Munich, Fed. Rep. of Germany

[21] Appl. No.: 753,108

[22] Filed: Jul. 9, 1985

[30] Foreign Application Priority Data

Jul. 13, 1984 [DE] Fed. Rep. of Germany ....... 3425905

[51] Int. Cl.$^4$ .............................................. G05F 1/10
[52] U.S. Cl. ................................... 323/222; 323/266; 323/271; 323/901
[58] Field of Search ............................ 363/17, 49, 21; 323/222, 267, 272, 901, 266

[56] References Cited

U.S. PATENT DOCUMENTS 3,160,829 12/1964 Mahland ........................... 363/49 X
4,245,285 1/1981 Weiss ..................................... 363/17

FOREIGN PATENT DOCUMENTS

3221404 12/1983 Fed. Rep. of Germany .

Primary Examiner—Patrick R. Salce
Assistant Examiner—Emanuel Todd Voeltz
Attorney, Agent, or Firm—Hill, Van Santen, Steadman & Simpson

[57] ABSTRACT

In a circuit arrangement for feeding electrical users by DC series feed, remotely fed users are respectively preceded by a DC-DC converter which contains a switch controller having a switch element parallel to an input thereof and having a capacitor connected thereto via a diode. In such a circuit arrangement, it is desired that the voltage appearing at the input during the start-up operation should remain below a prescribed amount. For this purpose, the control circuit is designed such that it emits a pulse sequence having a fixed or limited pulse-duty factor during the start-up operation and/or such that at least one part of the load is disconnectable with the assistance of a switch means. The circuit arrangement can be advantageously employed in switch controllers which precede remotely fed users in communications transmission devices with DC series feed.

14 Claims, 7 Drawing Figures

CIRCUIT ARRANGEMENT FOR FEEDING ELECTRICAL USERS

RELATED APPLICATIONS

This application is related to the following applications of the same assignee: "Circuit Arrangement For Feeding Electrical Users Via A Switch Controller", Musil, U.S. Ser. No. 753115; and "Circuit Arrangement For Feeding Electrical Users With A DC Voltage", Musil, U.S. Ser. No. 753127.

BACKGROUND OF THE INVENTION

The invention relates to a circuit arrangement for feeding electrical users from a remote feed apparatus by means of a DC series feed from at least one current source. At least one user is connectable to the remote feed circuit via a DC-DC converter at various locations of the remote feed circuit. The DC-DC converter contains a switch controller for generating a DC voltage from constant current. A switch element is positioned parallel to an input of the first switch controller. A control circuit controls the DC-DC converter dependent on a DC voltage to be held at least approximately constant. A diode is provided between the switch element and a capacitor connected parallel to an output of the switch controller. The diode is poled such that the diode is inhibited given a conductive switch element.

Such a circuit arrangement is already disclosed by German OS No. 32 42 023 or by German No. OS 32 21 404, both incorporated herein by reference.

The circuit arrangement of German No. OS 32 42 023 discloses a constant-current-fed converter which generates a constant, potential-separated voltage for a variable load in such fashion that a correspondingly controlled inductor converter converts a variably accepted voltage into a stabilized voltage. The stabilized voltage is somewhat higher than the input voltage allocated to the maximum power. The output voltage is generated in potential-separated manner from the stabilized voltage by an uncontrolled flow converter.

When a plurality of such circuit arrangements have their inputs at a common feed circuit, and when the constant current source feeding the feed circuit is switched on, then the voltage to be exerted by the constant current source must be significantly higher under certain conditions than the maximum voltage which must be made available for the intended operating modes.

Furthermore, a protection against influencing currents is not possible without further work for such devices since they reduce their input voltage with increasing input current. Also, overvoltage arresters usual for ohmic load users, for example, do not respond. The high currents which then flow can, however, destroy the device.

SUMMARY OF THE INVENTION

It is an object of the invention to design the circuit arrangement of the type initially cited such that the input voltage which derives during the start-up operation after the feeding constant current is switched on is not significantly greater than the maximum occurring input voltage during normal operation.

When starting up, the known circuit arrangement first accepts a voltage which is roughly equal to the voltage the current-voltage converter outputs to the voltage converter. For covering overload cases, however, this could have been selected relatively high.

In accordance with the invention, the control circuit controlling the DC-DC converter emits a pulse sequence during start-up operation. The pulse sequence has a pulse-duty factor set such that a voltage at the input of the first switch controller is lower than a maximum possible value of the input voltage at a conclusion of the start-up operation.

The switch controller thus runs up with a duty factor cycle matched to the remote feed device and does not switch to its normal control mode until the voltage output from the switch controller to the DC voltage converter has built up. Alternatively or additionally, the connection of the load circuit or of the load circuits can be delayed until after the run-up.

As a result of these techniques, the advantage arises that the input voltage which results during the run-up operation can be selected in consideration of the requirements of the remote feed device. If required, the input voltage can even be significantly lower than the maximum input voltage appearing during normal operation when this is necessary on the basis of specific prescriptions for the remote feed system.

DESCRIPTION OF THE PREFERRED EMBODIMENTS

Figure 1:
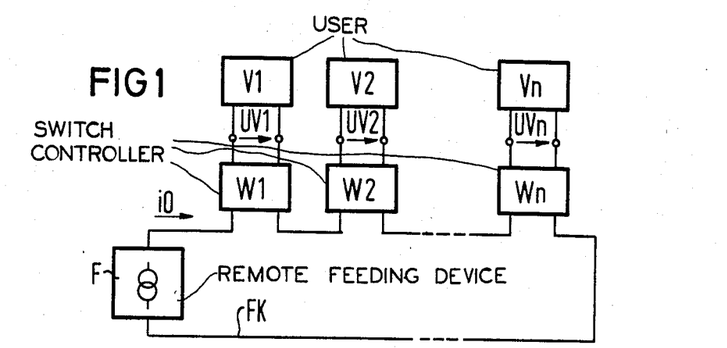
FIG. 1 is a diagram of an apparatus for the remote feed of electrical users by means of DC series feed.

FIG. 1 shows a remotely fed system as a block circuit diagram. The remote feeding device F emits a constant direct current $i_o$. The users V1, V2, ... Vn to be remotely fed are best operated with constant voltage at their feed input. The preceding switch controllers W1, W2, ..., Wn convert the current $i_o$ impressed at their input into a constant voltage $U_{V1}$, $U_{V2}$, ... $U_{Vn}$ for the user.

Figure 2:
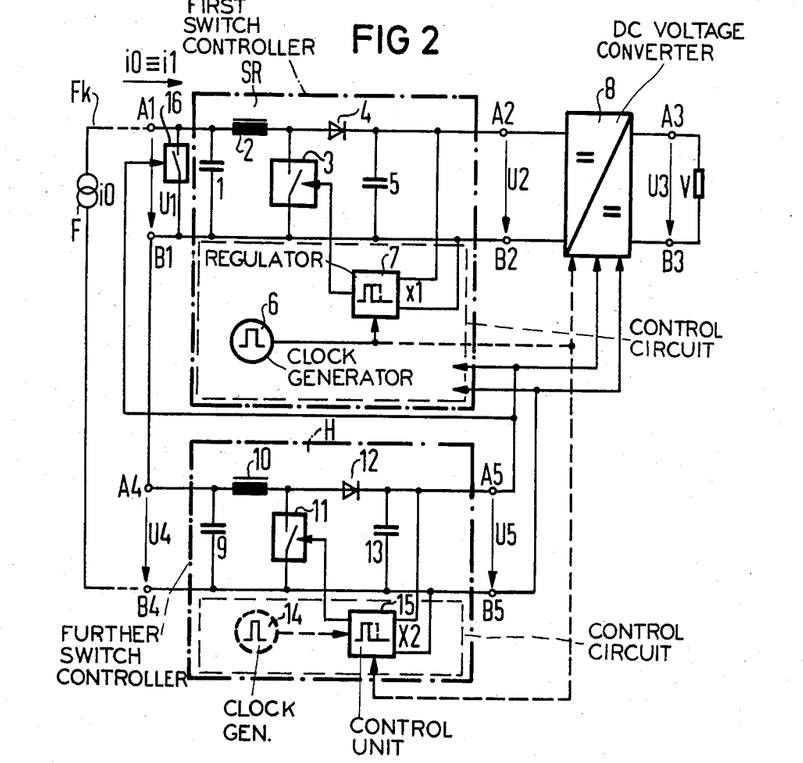
FIG. 2 is a diagram of a switch controller which converts an impressed DC into a constant voltage, and a device for generating auxiliary voltage.

The circuit arrangement shown in FIG. 2 contains the switch controller SR, the voltage converter 8, and the device H for generating auxiliary voltage. The switch controller is designed in known fashion as an inductive converter and can, however, also be executed in some other fashion. What is essential is that it is equipped with a switch in its shunt arm and this switch is opened and closed by a control circuit which can in turn be influenced from the outside. When the circuit arrangement has a tendency to initially accept a high input voltage, the described start-up behavior with a limited duty cycle is particularly advantageous. In the switch controller SR, the capacitor 1 is parallel to the input and the capacitor 5 is parallel to the output. The capacitors 1 and 5 and the switch element 3 are connected in unipolar fashion to one another. The capacitors 1 and 5 are connected at the side facing away from this junction via a series connection of the inductor 2 and the diode 4, whereby the inductor 2 is at the input and the diode 4 is poled such that it is transmissive for currents from the input to the output. The switch element 3 is in a shunt arm of the switch controller between the junction of the inductor 2 and diode 4 on the one hand and the junction of the capacitors 1 and 5 on the other hand.

The switch controller SR forms the actual current-voltage converter. This is composed of the inductor 2 and the semiconductor switch 3 which lie in series with one another directly in the remotely fed line train; the capacitor 1 which is small in comparison to the capacitor 5 at the output of the switch controller, is parallel thereto.

The semiconductor switch 3 is opened and closed by a pulse-width-modulated signal so that exactly as much energy from the remote feed circuit and from the energy stored in the inductor 2 and the input capacitor 1 is conducted via the diode 4 to the output capacitor 5, and so that the voltage remains constant at the output capacitor 5 as long as a specific, maximum load current which can at most be equal to the remote feed current $I_o$ at this location is not exceeded. The control of the pulse-width-modulated signal occurs in the same manner as in known inductor converters.

Due to the constant voltage U2 at its input, the DC converter 8 following the switch controller can be designed in a simple fashion according to one of the known principles. It is preferably an unregulated flow converter with an isolation transformer. Its clock frequency is advantageously taken from the same oscillator 6 which also controls the switch controller.

The device can also follow rapid load fluctuations since the input capacitor 1 is relatively small and is therefore quickly re-charged to the new input voltage corresponding to the modified load case. The voltage converter, which is sluggish in comparison thereto based on its principle of operation, is not affected by the change in its operating mode.

The clock generator 6, the controller 7, and, under given conditions, the voltage converter 8 as well require an auxiliary voltage. This is generated in the further switch controller H. According to FIG. 2, it has the same function as the switch controller SR. Switch means corresponding to one another are 9 and 1, 10 and 2, 11 and 3, 12 and 4, 13 and 5, 14 and 6 as well as 15 and 7. The switch means of the switch controller H are dimensioned for the demands prevailing there, and are dimensioned according to the same principles as the switch controller SR. Preferably, the clock generator 6 is also employed for the switch controller H so that the clock generator 14 can be omitted.

The switch controller H generates a positive and a negative auxiliary voltage related to the potential of the terminals B1 and B2 directly connected to one another. Since the voltage U5 is greater than the voltage U4 and both voltages relate to the potential of the terminal connection B4, B5, the positive auxiliary voltage available is the voltage U5 - U4. The voltage U4 serves as a negative auxiliary voltage. Given standard dimensioning, U5 is thus greater than U4 by roughly the factor 5 to 10, this also meeting the demands which are usually raised. Given, for example, a remote feed current of 0.4 A, standard auxiliary voltages of about 10...20 V thus derive and the comparatively low output power of the auxiliary voltage source produces a voltage U4 of about 2V.

It is necessary for the start-up of the auxiliary voltage generation that, given an open switch 11, the voltage U5 first reaches the value at which the clock generator 14 and the control device 15 begin to operate. When the voltage U5 reaches its rated value, then the regulator 15 begins to operate and correspondingly drives the switch 11 with pulses such that it is periodically closed. The voltage U4, which is initially about as great as the voltage U5, is reduced within a few milliseconds to its later value. The positive auxiliary voltage U5 - U4 is then available for the switch controller SR and for the converter 8. The reduced voltage U4 remains as a negative auxiliary voltage.

The auxiliary voltage begins very quickly in an advantageous way. This results since, after the turn-on, the capacitors 9 and 13 first charge and, following thereupon when the control of the switch controller H begins, the voltage at the capacitor 9, which has a relatively small capacitance, collapses. No transition states, which could damage sensitive power components, thus occur for the circuit arrangement.

In order not to receive any voltage which is running up in an undefined fashion between the terminals A1 and B1 during the time of the start-up of the auxiliary voltage, a switch 16 is inserted at the input of the switch controller SR in the arrangement shown in FIG. 2. In a modification of this arrangement, the switch 3 can be wired such that it remains closed as long as the auxiliary voltage has not yet begun. Thus, the switch 16 can be omitted.

The switch 16 which lies at the input of the switch controller SR is initially closed and is only opened when the auxiliary voltage is present. Given a slow run-up of the voltage lying between the points A1 and B4 as occurs under certain conditions due to poor dynamic properties of the remote feeding device F, or due to cable capacitances, it thus can be avoided that the switch controller SR picks up too much voltage in an uncontrolled fashion. The switch 16 is preferably a normally closed contact of a relay whose winding is driven by the auxiliary voltage (U5 - U4).

It is particularly advantageous to employ the switch 3 which is present in every case, instead of the switch 16. When a MOS field effect transistor is employed at this location, then it suffices to connect a high-resistance resistor between its gate and drain, or terminal A2, in order to get it into an adequately conductive condition when the current $i_o$ is switched on. Such a circuit arrangement proceeds from FIG. 3.

The auxiliary voltage can also be generated in some fashion other than that described above. It can, for example, be derived from the input voltage U1 or from the output voltage U2 of the switch controller SR. In both instances, a resistor or Zener diode then preferably lies in series with the switch 16 in order to guarantee a certain minimum voltage for generating the auxiliary voltage. However, the module H generating the auxiliary voltage must then be fed with a voltage which fluctuates greatly when it runs-up itself, and when there are load fluctuations, this makes the realization of a stable auxiliary voltage source more difficult.

Figure 3:
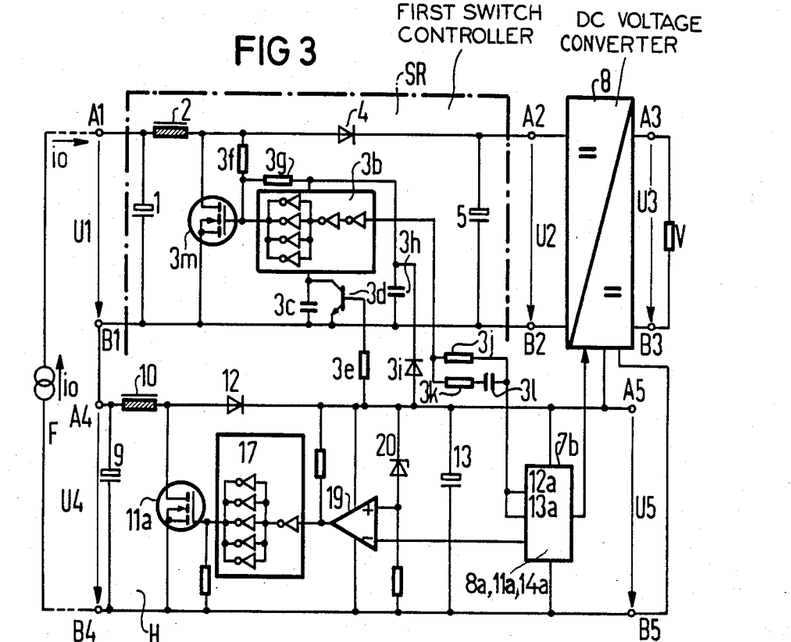
FIG. 3 is a diagram of a switch controller according to FIG. 1 with further details of the device for generating auxiliary voltage.

In the circuit arrangement shown in FIG. 3, the integrated circuit SG 3524 J referenced 7b serves as clock generator 6 and regulator 7. It generates the clock and controls the switch controller SR with width-modulated control pulses. The saw-tooth voltage output by this circuit is conducted to the comparator 19 which compares it to the voltage U5 reduced by the voltage drop at a Zener diode 20. The pulses at the output of the comparator 19 control switching transistor 11 via the driver 17. The stabilization acquired with this simple arrangement is adequate. The voltage U5 can, for example, amount to about 13 V and the corresponding input voltage U4, given a running overall apparatus, can, for example, amount to about 1.6 V given a remote feed current $i_o = 0.4$ A.

The additional components $3f \ldots 3l$ around the control component $3b$ of the switch in the switch controller SR prevent the voltages in the auxiliary converter H which are initially negative in comparison to the potential of terminal B1, from establishing a negative voltage at the gate of the field effect transistor $3m$ and thus prevent the closing of this switch. Thus, it is also possible to keep the resistor $3f$ between the gate and drain of the field effect transistor $3m$ of such high resistance that it only causes very low losses in the operating condition.

This type of generated auxiliary voltage can also be combined in an advantageous way with current-fed converters provided in some other fashion. In particular, it is likewise applicable to power supply circuits for the auxiliary voltage required at the input side wherein a switch element is inserted into the feed circuit in combination with differently constituted switch means.

After the run-up of the auxiliary voltage, the switch 16 is open and/or the switch 3 is driven with pulses by the drive device. Since the voltage U2 is still too low at first, the regulation in and of itself would be the maximum possible input voltage U1. For certain uses, the switch controller SR is preferably dimensioned such that an overload produced, for example, due to a malfunctioning user V can still be governed at least over a short duration. One need only count on one or a few such overload cases in a remote feed device having many users. When the switch controllers SR during a turn-on, occurring simultaneously for all circuit arrangements according to FIG. 1 in such a remote feed device, behave as they behave when handling overload situations, then the constant current source of the remote feed device must be correspondingly dimensioned. It is then over-dimensioned for practical operation or can perhaps not even be realized at all.

Additional techniques can be undertaken which prevent a simultaneous turn-on of all devices. This, however, requires a differing design or adjustment of the remotely fed devices.

The regulated control module 7 is operated such that a pulse sequence having a fixed or at least limited pulse-duty factor is first output, and thus a voltage $V_{1on}$ which is lower than the maximum possible input voltage $U_{1max}$ after the conclusion of the start-up operation is established at the terminal pair A1, B1 during the overall start-up operation. The switch controller SR and, under given conditions, the converter 8 are then initially operated with the power consumption allocated to the voltage $V_{1on}$ and their capacitors charged. When the voltage U2 exceeds its rated value by a defined, small amount $\Delta$U2, then a voltage discriminator informs the regulator 7 of this, the regulator 7 then being switched into its normal operating mode. The regulation then initially reacts with a reduction of the input voltage U1, whereby the voltage U2 also drops. When the rated value of the voltage U2 is reached, the input voltage U1 allocated to the output power is established. Instead of the voltage U2, the voltage U3 can be evaluated under given conditions.

The acquisition of the voltage U2 can occur in known fashion. In accordance with FIG. 4, the same voltage divider 23, 24, 25 as serves for regulation in the operating situation, and the same reference voltage which is available at the terminal 16a of the drive device 7b, are preferably employed.

It is particularly advantageous when the auxiliary voltage is already available at the beginning of the start-up behavior insofar as possible, as is the case given the circuit arrangement of FIG. 3.

When the auxiliary voltage is not immediately available, then the drive of the switch 16 can also be provided with a time delay, or with a device which only responds when the auxiliary voltage has reached a certain minimum value required for the faultless operation of the modules to be driven. Such a means can, in particular, be a Zener diode in series with resistor 16h in the FIG. 6 to be described below whose value approximately corresponds to the minimum required value of the auxiliary voltage.

It is advantageous to dimension the pulse-duty factor during start-up such that it is just slightly higher than would be established when the user V consumes its nominal power. Malfunctioning users having too great a power consumption are then automatically not fully connected.

In a second advantageous dimensioning, proceeding from the operating situation wherein the remote feed device must output its highest power, the possible power consumption for the start-up of the switch controller is calculated and the corresponding pulse-duty factor is subsequently calculated. The shortest possible run-up time for the remote feed device it thus obtained without having to provide unnecessary reserves for the operating case.

A further advantageous development is that users are first entirely or partially disconnected, and the possible power consumption for the start-up of the switch controller is dimensioned according to the operating situation in which the lowest remote feed voltage is available per device. The user or users are then connected after the start-up operation. The initiation of this operation preferably occurs by means of the same apparatus which also recognizes the end of the start-up operation and switches to the normal operating mode.

Figure 4:
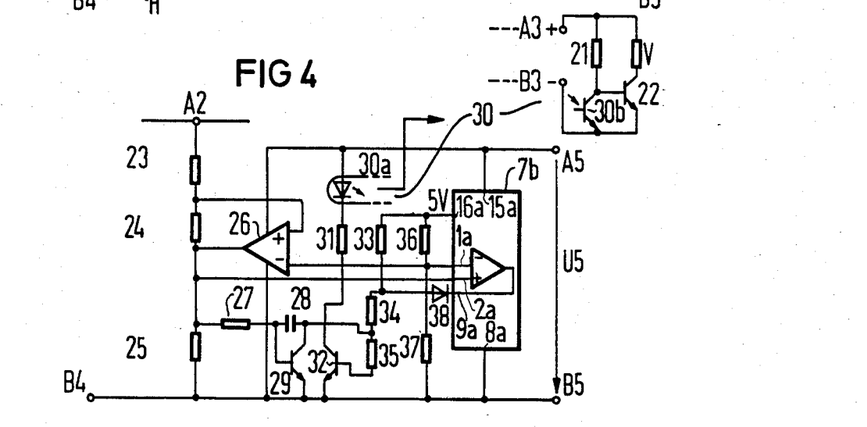
FIG. 4 is a diagram of a detail from the circuit arrangement of FIG. 3 showing further details.

FIG. 4 shows a detail from a circuit arrangement of FIG. 2. The regulator 7b is an integrated drive circuit SG 3524 J, and contains an operational amplifier which has its negative input at the terminal 1a, has its positive input at the terminal 2a, and has its output at the terminal 9a. The regulator 7b also contains a reference voltage source whose output is at the terminal 16a. The voltage divider 36, 37 at 16a divides the reference voltage 5V to 2.5V, which in turn forms the rated value of the regulator in 7b and, on the other hand, is adjacent to the negative input of the comparator or discriminator 26 which has an open collector output.

The voltage between the terminals A2, B4 serves here as a control voltage. This is of approximately the same size as the voltage U2 to be regulated in the device between the terminals A2 and B2. The circuit format thereof becomes simpler because the circuit 7b lies at the auxiliary voltage which has B4 as a negative reference potential.

In the operating case, the voltage divider 23+24 to 25 defines the actual value of A2, B4 which governs the control circuit in the module 7b. In the start-up mode, the open collector of discriminator 26 is connected to B4. The regulating amplifier in the circuit 7b encounters a stop which is formed by the voltage divider 33, 34, and 35 in cooperation with the base-emitter diode of 32 and with the diode 38.

The voltage divider 23 and 24 is effective in the start-up mode since the output of discriminator 26 shorts the resistor 25. The value at this voltage divider is compared to a voltage of 2.5V. When the voltage A2, B4 has exceeded the rated value by a small prescribed amount, the 2.5 V is exceeded and the output of discriminator 26 becomes a high resistance. The start-up is thus concluded. The regulator in module 7b can now function freely, and via the voltage divider resistors 33, 34, and 35, the transistor 29 has been simultaneously switched in conjunction with a time constant formed by resistor 27 and capacitor 28. During the start-up, the resistor chain 33, 34, and 35 simultaneously controls the transistor 32 and biases it into its conductive condition so that it then addresses the LED 30a in the opto-coupler 30 via the resistor 31. During the start-up, this opto-coupler 30 disconnects the user V since its transistor 30b then shorts the base-emitter diode of the transistor 22. After the start-up, the transistor 32 is inhibited by the transistor 29, which is now conductive, and the light-emitting diode 30a in the opto-coupler is no longer driven. The transistor 30b thus becomes high in resistance, the transistor 22 becomes conductive via the current through the resistor 21, and the user V is supplied with current. The connection of the user or of the users can also be indirectly or directly effected in some other fashion.

Given the circuit arrangement of FIG. 4, the user is disconnected during the start-up operation. The user is then connected after the start-up. In a modification of the circuit arrangement shown in FIG. 4, a plurality of users can be provided under given conditions, only one portion of these being disconnected during the start-up operation. Furthermore, a user can be partially disconnected under given conditions.

The disconnection of the user is started according to FIG. 4 by the arrangement which serves for switching from a limited pulse-duty factor for start-up to a freely regulated pulse-duty factor in the operating case. This is particularly advantageous when the circuit arrangement is to operate in a plurality of different remote feed devices, or is to be operated with different users. The start-up behavior can then be adapted to the operating case or turn-on case for which there are the most restrictions, i.e. for the remote feed system, the lowest voltage per circuit arrangement is made available to the circuit arrangement in the operating case, or during the start-up of the remote feed system.

The additional expense is also very low here since the voltage divider required for the limitation of the maximum duty cycle can also be employed for the operating case with different values. The voltage divider then forces the switch 3 to always function in a switch mode in a fashion known per se, even given a greater overload.

Current-voltage converters having input-side matching of the voltage to the respectively required power consumption, reduce their input voltage when the input current is boosted. The fact that this boost results from a malfunction, usually due to the induction of a current from outside of the system, is not recognizable. A slight boost of the current in the remote feed circuit is without significance at first and does not deteriorate the function of the circuit arrangement. When, however, the current in the remote feed circuit rises above a certain degree, then either the switch 3 must be dimensioned therefor, or there is the danger that the circuit arrangement will fail.

The remote feed current is acquired with a sensor element. The converter can be bridged during the time of the impermissible overcurrent by an additional current path which is driven from the sensor element, and which eliminates the overcurrent. This current path is formed in a particularly simple way by the same devices which also short-circuit the switch controller SR functioning as a main converter during the start-up of the auxiliary voltage.

The switch 16 of FIG. 2 insures that the input of the switch controller SR is bridged during the time of an impermissibly high input current $i_o$. The switch 3 of the switch controller SR can also be advantageously employed for this purpose. Although it must be designed for overcurrent in this case, it need not switch this current with the clock frequency. This represents a considerable alleviation.

Figure 5:
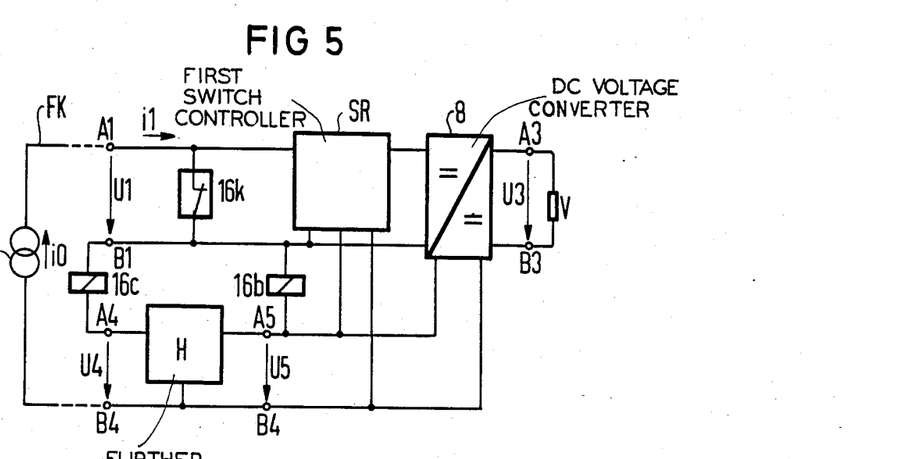
FIG. 5 is a diagram of a switch controller comprising a relay contact at the input which also serves for the elimination of overcurrents.

According to FIG. 5, the switch 16 comprises a relay which has a normally closed contact 16k in order to guarantee the start-up behavior of the circuit arrangement. After the run-up of the auxiliary voltage U5 - U4, the switch is opened by this voltage via the winding 16b. In order to eliminate the overcurrents, a second winding in the line sequence of the terminals B1–A4, preceding the terminal A1 or following B4, is preferably provided for the relay 16. This closes the normally closed contact in the sense of a make contact. This winding is shown in FIG. 5 between the terminal B1 and A4 and is referenced 16c. The second winding, however, is dimensioned such that the auxiliary voltage can hold the contact of the relay open given normal remote feed current. Particularly advantageous given such a solution is that disruption of the auxiliary voltage, produced for example by high superimposed alternating currents to which the auxiliary converter H cannot properly respond, contributes to a closing of the contact 16 in the same fashion and this does not allow operation of the switch controller SR serving as a power converter until the auxiliary converter H functions properly.

Figure 6:
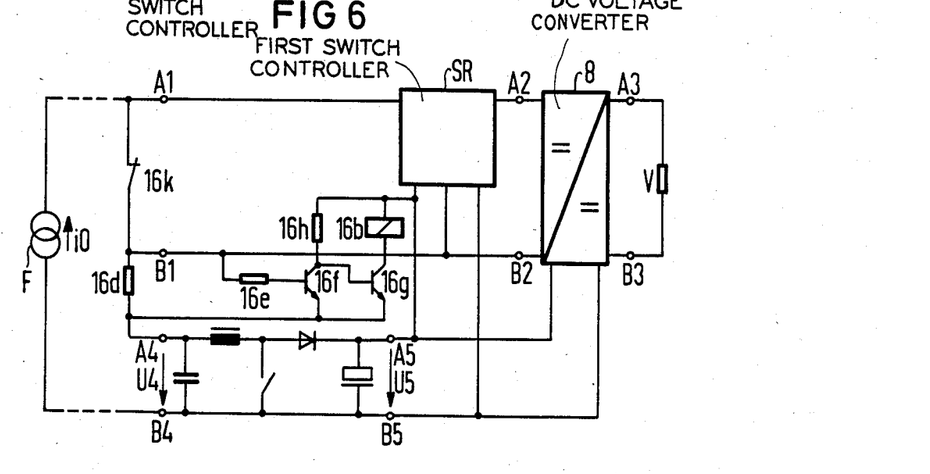
FIG. 6 is a diagram of a further embodiment of the arrangement of FIG. 5.

Instead of a second winding, a current sensor in the form, for example, of a resistor can lie in the line sequence A1, B4, this resistor directly or indirectly closing the switch 16. Such a solution is shown in FIG. 6. In FIG. 6, the voltage drop at a resistor 16d controls a transistor 16f via a resistor 16e, this transistor 16f being inhibited given normal remote feed current. Driven via the resistor 16h, the transistor 16g can therefore conduct current and open the normally closed contact 16k via the winding 16b as soon as the auxiliary voltage U5 - U4 begins. When the remote feed current $i_o$ exceeds a prescribed value, then the transistor 16f becomes conductive. The transistor 16g which is then inhibited enables a closing of the normally closed contact 16d. Similar to the fashion shown in FIG. 6, the circuit can also be preferably constructed with a time delay in order to work more smoothly given alternating currents.

A further advantageous possibility is to close the switch 3 given overcurrent. In this case, however, the auxiliary converter H must continue to operate at least adequately in order to guarantee an active drive of the switch 3. That is usually possible given the usually comparatively low power output of the auxiliary converter H.

Figure 7:
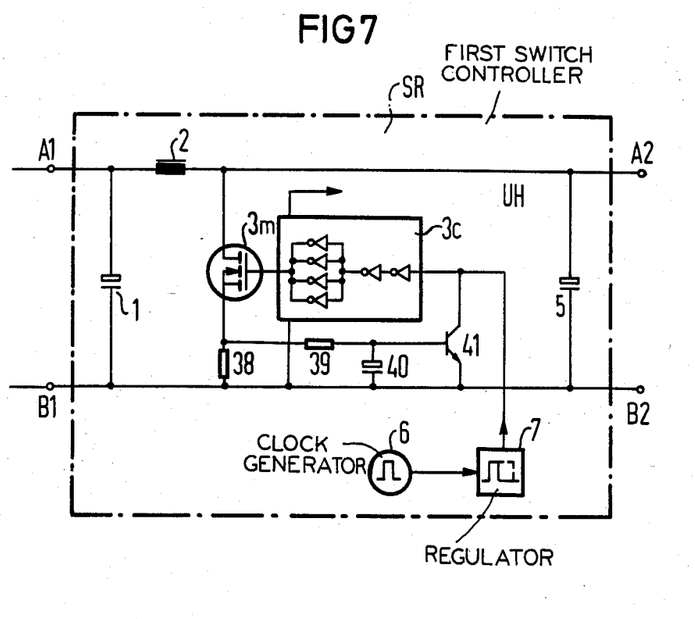
FIG. 7 is a diagram of a switch controller whose switch element is additionally exploited for the elimination of overcurrents.

FIG. 7 shows a detail of a circuit arrangement wherein the switch 3 is used for eliminating the overcurrent. The current is acquired here as a voltage drop at a 1 ohm resistor 38 in series with the power MOS field effect transistor forming the switch 3 and is conducted via a RC element 39, 40 to a transistor 41. The transistor 41 is operated on the line sequence of the drive in such a fashion that the switching transistor 3m remains constantly conductive. Since only high overcurrents are to be acquired, it is of little significance whether the sensor element lies directly in the path of the remote feed current or in series with the switch 3 where the current flowing in the output circuit of the switch controller SR is not acquired.

The described techniques for bridging the switch controller SR during run-up of the auxiliary voltage and given overcurrent can also be combined, for example a relay 16 having a normally closed contact which is closed by the auxiliary voltage, and a second relay which has a make contact parallel to this normally closed contact and which is closed by a winding in the remote feed circuit given overcurrent. Although these combinations are more involved, they can provide advantages under given conditions since the components or modules respectively employed need only handle one of the two required jobs and can thus be more easily adapted thereto.

The relay with its normally closed contact and its winding 16b and 16c from FIG. 5 can, under given conditions, be designed as an electronic relay or electronic circuit with or without a relay, and thereby also employ the switch 3.

The circuit arrangement can be fed in a remote feed system according to FIG. 1 in common with identical or different, further circuit arrangements. The circuit arrangements W1 ... Wn can be identically or differently designed and/or dimensioned.

Given a preferred embodiment of the circuit arrangement of FIG. 3,
the value of the resistor 3f is 2 M ohm
the value of the resistor 3g is 100 k ohm, and
the value of the resistor 3j is 1 M ohm.

A diode having a low leakage current is selected as diode 3i.

Although various minor changes and modifications might be proposed by those skilled in the art, it will be understood that I wish to include within the claims of the patent warranted hereon all such changes and modifications as reasonably come within my contribution to the art.

I claim as my invention:

1. A circuit arrangement, comprising:
 remote feed means for feeding electrical users by DC series feed in a remote feed circuit from at least one constant current source;
 DC-DC converter means for connecting at least one user to the remote feed means at a location in the remote feed circuit;
 the DC-DC converter means containing a first switch controller means for generating a DC voltage from constant current and which has a switch element connected parallel to an input thereof;
 control circuit means for controlling the switch element dependent on a DC voltage at an output of the first switch controller means to be held at least approximately constant;
 a diode between the switch element and a capacitor connected parallel to an output of the first switch controller means, said diode being poled such that the diode is inhibited given a conductive switch element; and
 the control circuit means emitting a pulse sequence during start-up operation, the pulse sequence during start-up having a pulse-duty factor set such that a voltage at the input of the first switch controller means is lower than a maximum possible value of the input voltage after conclusion of the start-up operation.

2. A circuit arrangement according to claim 1 wherein a switch device means is provided for disconnecting during the start-up operation at least a part of a load created by the at least oner user fed by the DC-DC converter means.

3. A circuit arrangement according to claim 1 including a voltage discriminator means connected to the first switch controller means for identifying a conclusion of the start-up operation.

4. A circuit arrangement according to claim 3 wherein said control circuit means sets the pulse-duty factor during the start-up operation such that a power consumption of the user and connected converter is greater by a prescribed amount than a power consuption of the user and connected converter during normal operation at a nominal power.

5. A circuit arrangement according to claim 1 wherein said control circuit means associated with said at least one user modifies the pulse-duty factor effective during the start-up operation of the corresponding first switch controller means such that a sum of input voltages of all of the DC-DC converter means in the remote feed circuit is smaller by a prescribed amount than a maximum voltage which is emittable by the constant current source if the pulse-duty factor of said corresponding first switch controller means was not modified and was set for normal operation of the corresponding user and DC-DC converter.

6. A circuit arrangement according to claim 1 wherein a controllable switch is positioned parallel to the input of the first switch controller means, and means are provided for closing at least one of the controllable switch or the switch element of the first switch controller means before the start-up operation.

7. A circuit arrangement according to claim 6 wherein a current sensor means controls the controllable switch, the current sensor means lying in series with an input of the first switch controller means such that it is closed at currents which exceed a prescribed limit value.

8. A circuit arrangement according to claim 6 wherein a current sensor means is connected in series with the switch element of the first switch controller means; and the current sensor means controlling the switch element such that it closes, given currents which exceed a prescribed limit value.

9. A circuit arrangement according to claim 6 wherein the controllable switch comprises a normally closed contact of a relay having a control winding controlled by a second switch controller means relating to a difference between output voltage and input voltage of said second switch controller means; and the relay having two windings of which one is connected to an auxiliary voltage and the other is connected to the current sensor means.

10. A circuit arrangement according to claim 6 wherein a switch controller means of an auxiliary voltage generator controls the controllable switch such that the controllable switch is open only given presence of an auxiliary voltage output by the auxiliary voltage generator and which supplies said control circuit means for drive of the switch element.

11. A circuit arrangement according to claim 1 wherein said control circuit means of the first switch controller means is supplied from an auxiliary voltage generator; said auxiliary voltage generator comprising auxiliary voltage switch controller means with a switch element connected parallel to an input of the auxiliary voltage switch controller means; and a diode connected between the switch element and a capacitor parallel to an output of the auxiliary voltage switch controller means, said diode being poled such that the diode is inhibited given a conductive switch element; and the first and auxiliary voltage switch controller means being connected in series with one another at their inputs.

12. A circuit arrangement, comprising:
remote feed means for feeding electrical users by DC series feed in a remote feed circuit from at least one constant current source;
DC-DC converter means for connecting at least one user to the remote feed means at a location in the remote feed circuit;
the DC-DC converter means containing a first switch controller means for generating a DC voltage from constant current and which has a switch element connected parallel to an input thereof;
control circuit means for controlling the switch element dependent on a DC voltage fed to the user to be held at least approximately constant;
a diode between the switch element and a capacitor connected parallel to an output of the first switch controller means, said diode being poled such that the diode is inhibited given a conductive switch element; and
the control circuit means emitting a pulse sequence during start-up operation, the pulse sequence having a pulse-duty factor set which differs from a pulse-duty factor during normal operation such that a voltage at the input of the first switch controller means does not exceed a maximum possible value of the input voltage after a conclusion of the start-up operation.

13. A circuit arrangement, comprising:
remote feed means for feeding electrical users by DC series feed in a remote feed circuit from at least one constant current source;
DC-DC converter means for connecting at least one user to the remote feed means at a location in the remote feed circuit;
the DC-DC converter means containing a first switch controller means for generating a DC voltage from constant current and which has a switch element connected parallel to an input thereof;
control circuit means for controlling the switch element dependent on a DC voltage fed to the user load to be held at least approximately constant;
a diode between the switch element and a capacitor connected parallel to an output of the first switch controller means, said diode being poled such that the diode is inhibited given a conductive switch element;
an auxiliary voltage generator means in series with the first switch controller means and also connected to the constant current source for feeding an auxiliary voltage to the control circuit means associated with the first switch controller means;
a controllable switch positioned parallel to the input of the first switch controller means; and
means for closing the controllable switch during build-up of the auxiliary voltage, and opening it after the auxiliary voltage has built up.

14. A circuit arrangement according to claim 13 including a switch means for disconnecting at least a part of a load presented by the user connected to the DC-DC converter means during the start-up operation and connecting the full load after an end of the start-up operation.

* * * * *